US009587542B2

(12) United States Patent
Winkler et al.

(10) Patent No.: US 9,587,542 B2
(45) Date of Patent: Mar. 7, 2017

(54) METERING MODULE WITH HIGH-TEMPERATURE RESISTANCE

(71) Applicant: Robert Bosch GmbH, Stuttgart (DE)

(72) Inventors: Jochen Winkler, Esslingen (DE);
Achim Knittel, Ditzingen (DE);
Stephan Pohl, Schwieberdingen (DE);
Martin Kiontke, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 9 days.

(21) Appl. No.: 14/432,325

(22) PCT Filed: Jul. 29, 2013

(86) PCT No.: PCT/EP2013/065864
§ 371 (c)(1),
(2) Date: Mar. 30, 2015

(87) PCT Pub. No.: WO2014/048611
PCT Pub. Date: Apr. 3, 2014

(65) Prior Publication Data
US 2015/0252710 A1 Sep. 10, 2015

(30) Foreign Application Priority Data
Sep. 28, 2012 (DE) .................. 10 2012 217 703

(51) Int. Cl.
*F01N 3/20* (2006.01)
*B23K 26/24* (2014.01)

(52) U.S. Cl.
CPC ............ *F01N 3/2066* (2013.01); *B23K 26/24* (2013.01); *F01N 2260/024* (2013.01);
(Continued)

(58) Field of Classification Search
CPC ............ F01N 3/2066; F01N 2260/024; F01N 2610/11; F01N 9/002; F01N 3/0842;
(Continued)

(56) References Cited

U.S. PATENT DOCUMENTS 6,484,700 B1 * 11/2002 Kimmel ............ F02M 51/0682
123/531
2007/0033927 A1 * 2/2007 Homby ................ F01N 3/0821
60/286
(Continued)

FOREIGN PATENT DOCUMENTS

DE 4436397 4/1996
DE 102009060065 6/2011
(Continued)

OTHER PUBLICATIONS

International Search Report for Application No. PCT/EP2013/065864 dated Oct. 22, 2013 (English Translation, 2 pages).

*Primary Examiner* — Patrick Maines
(74) *Attorney, Agent, or Firm* — Michael Best & Friedrich LLP

(57) ABSTRACT

The invention relates to a device for cooling a metering module (10) for dispensing a process liquid/auxiliary agent into the exhaust gas system of an internal combustion engine. The metering module (10) comprises a housing (12) with a plurality of housing sections (19), (20), (28), (29). A first housing section (19), (20), on which a supply line (18) for the process liquid/auxiliary agent is located, is situated in a region (62) of the metering module (10) that is exposed to varying temperatures, said section being made of metal.

10 Claims, 2 Drawing Sheets

(52) U.S. Cl.
CPC ....... *F01N 2610/02* (2013.01); *F01N 2610/11* (2013.01); *F01N 2610/1453* (2013.01); *Y02T 10/24* (2013.01)

(58) Field of Classification Search
CPC ......... F01N 13/02; F01N 3/035; B23K 26/24; F02D 41/029
USPC .................................................. 60/295, 301
See application file for complete search history.

(56) References Cited

U.S. PATENT DOCUMENTS

| | | | |
|---|---|---|---|
| 2008/0236147 A1 | 10/2008 | Van Vuuren et al. | |
| 2010/0108020 A1 | 5/2010 | Miretti | |
| 2011/0147393 A1 | 6/2011 | Van Hooren et al. | |
| 2011/0168271 A1* | 7/2011 | Garcia ...................... | F16K 1/34 137/1 |
| 2014/0116032 A1* | 5/2014 | Yetkin ................... | F01N 3/2066 60/295 |
| 2014/0305104 A1* | 10/2014 | Knittel .................. | F01N 3/2066 60/295 |
| 2015/0059320 A1* | 3/2015 | Winkler ................ | F01N 3/2066 60/295 |
| 2015/0093302 A1* | 4/2015 | Pohl ...................... | F01N 3/2066 422/310 |
| 2016/0053650 A1* | 2/2016 | Seitz .................... | F01N 3/2066 137/340 |

FOREIGN PATENT DOCUMENTS

| | | |
|---|---|---|
| EP | 2503122 | 9/2012 |
| JP | 0996212 | 4/1997 |
| JP | 09096212 A * | 4/1997 |
| WO | 2012049175 | 4/2012 |

\* cited by examiner

METERING MODULE WITH HIGH-TEMPERATURE RESISTANCE

BACKGROUND OF THE INVENTION

DE 44 36 397 B4 relates to a device for the aftertreatment of exhaust gases. The device comprises an exhaust manifold system, in which a reduction catalytic converter is arranged for reducing $NO_x$ constituents of the exhaust gas from the internal combustion engine. The device further comprises a metering device, comprising an electrically controlled metering valve for the metered introduction of a reducing agent into the flow of exhaust gas delivered to the catalytic converter, as a function of a value for the $NO_x$ content of the exhaust gas stored in the mapping for various operating parameters of the internal combustion and the catalytic converter. The valve for controlling the air feed is an electrically controlled control valve, which is arranged downstream of outlet aperture of the metering valve and the outlet aperture of which opens directly into the exhaust gas flow from the internal combustion engine. The control valve is accommodated by a body with a cooling medium flowing round it, so that the control valve is cooled.

US 2008/0236147 A1 discloses an injection system, which as part of the selective catalytic reduction on a motor vehicle is used for reducing $NO_x$ fractions in the exhaust gas. According to this solution the injection system comprises an injector, which is supplied with current via an electrical connection. Situated within the electrical connection is an electrical contact which is configured to receive a connector of a connection lead.

The subject matter of US 2010/0108020 A1 is a connection system for electrical leads which are laid in hazardous areas, such as, for example, in an area in which there is a risk of explosion, for example in the surroundings of an internal combustion engine. The connection system disclosed is suitable for the electrical connection of leads of various sensors and components. The connection system comprises a protective rubber sleeve and a cap, which is provided with an internal thread. Here the protective rubber sleeve serves as an electrical and thermal insulator and is compressed in the assembled state of the connection system.

DE 10 2009 060 065 A1 discloses a fluid line for urea-water solutions in $NO_x$ reduction devices which function on the selective catalytic reduction (SCR) principle. The fluid line is made from a thermoplastic vulcanizate. The thermoplastic vulcanizate has rubber-like characteristics and is also known as a thermoplastic elastomer. An outstanding characteristic of the thermoplastic vulcanizate is its high resistance to aggressive fluids and it possesses a very high flexibility and an outstanding pliability. According to DE 10 2009 060 065 A1 a fluid line produced from a thermoplastic vulcanizate is used for connecting tanks, pumps and injection nozzles or to accommodate couplings.

In metering modules, which are used as part of exhaust gas aftertreatment systems, use is made of injection valves which serve for urea metering. In order to get as close as possible to the exhaust gas flow with the valve tip of the injection valve, the valve fixture in these metering modules is actively cooled. This is done through a connection of the valve body to the coolant circuit of the vehicle. This ensures that, even when the valve is positioned close to the exhaust gas, in operation the valve tip temperature does not exceed 120° C. Where in a metering module a connection fitting, made of plastic (PA66) and affording contact with the supply feed for the automotive fluid/additive, runs outside the cooling element, it is exposed to the ambient temperature and in critical operating states, such as at high ambient temperatures, for example, may heat up in operation or in the event of heat soak.

In such cases a high heat input may pass via the plastic connection fitting into the O-ring situated under the former and serving for sealing purposes.

SUMMARY OF THE INVENTION

According to the invention it is proposed that in a departure from the materials hitherto used the connection fitting of the metering module now be made from a metal. This means that the connection fitting stands up better to the high thermal loads in operation and to those occurring in the event of a heat soak, and to the mechanical stresses. Through the choice of material for the connection fitting and the associated improvement in the thermal conduction to the sealing element between the connection fitting and the injection valve of the metering module, it is possible to dispense entirely with a soft seal constituting a potential leakage point.

According to the invention it is proposed to connect the connection fitting directly to the injection valve of the metering module and to constitute a circumferential seal, for example by making a cohesive material connection such as laser welding. On the one hand this eliminates the soft seal, which as mentioned above has to be classed as very temperature-critical, and on the other it increases the robustness of this sealing considerably compared to the use of a soft seal.

In such an embodiment of the metering module the direct connection between the connection fitting and the injection valve would allow forces occurring in the pressure line, which in operation manifest themselves as vibrations, for example, to act directly on the injection valve, so that additional relief of the injection valve has to be provided. The injection valve of the metering module can be relieved of forces caused by the pressure line and inevitably occurring in operation, for example, by suitably connecting the connection fitting, now made of metal, to a connection plate, for example. This is likewise preferably done by forming a cohesive material connection, such as a laser weld seam, for example. The forces inevitably introduced into the injection valve via the connection fitting during operation can thereby be dissipated via the connection plate to a cooling element enclosing the injection valve. The injection valve can thereby be relieved of mechanical forces.

In a further advantageous embodiment of the solution underlying the invention the injection valve is axially held on the connection plate solely by way of the connection fitting attachment. A locking plate that would otherwise be necessary can be dispensed with, so that an additional weight and cost advantage can be achieved.

The solution proposed according to the invention makes it possible to create a temperature-resistant connection fitting which does not sustain any damage, even when it is exposed to very high ambient temperatures.

Since the solution proposed according to the invention opens up the possibility of creating a cohesive material connection between the connection fitting and the injection valve, the problem of sealing, which is bound to occur where a temperature-sensitive soft seal is used, is eliminated. The sealing, preferably in the form of a laser weld seam, is firstly temperature-resistant and secondly it is leak-tight. A selection of special soft seal materials can now be eliminated as can the soft seal itself. The latter is usually embodied as an O-ring. The solution proposed according to the invention eliminates this critical sealing site.

Furthermore, by exchanging plastic for metal the solution proposed according to the invention affords an increase in the strength of the connection fitting. Since in the solution proposed according to the invention the seal in the form of an O-ring made from a soft seal material can be dispensed with, the elimination of this particular component allows the valve to be shortened. This in turn has a beneficial effect on the design space needed for installation of the metering module, so that design space advantages can be secured in terms of the vehicle packaging. In addition, in assembling the metering module proposed according to the invention the production operations involving the fitting of the soft seal and the fitting of the locking plate securing the metering valve in an axial direction can be eliminated. The elimination of the locking plate moreover has an advantageous impact on the overall weight of the metering module.

BRIEF DESCRIPTION OF THE DRAWINGS

The invention is described in more detail below with reference to the drawing, in which.

DETAILED DESCRIPTION

Figure 1:
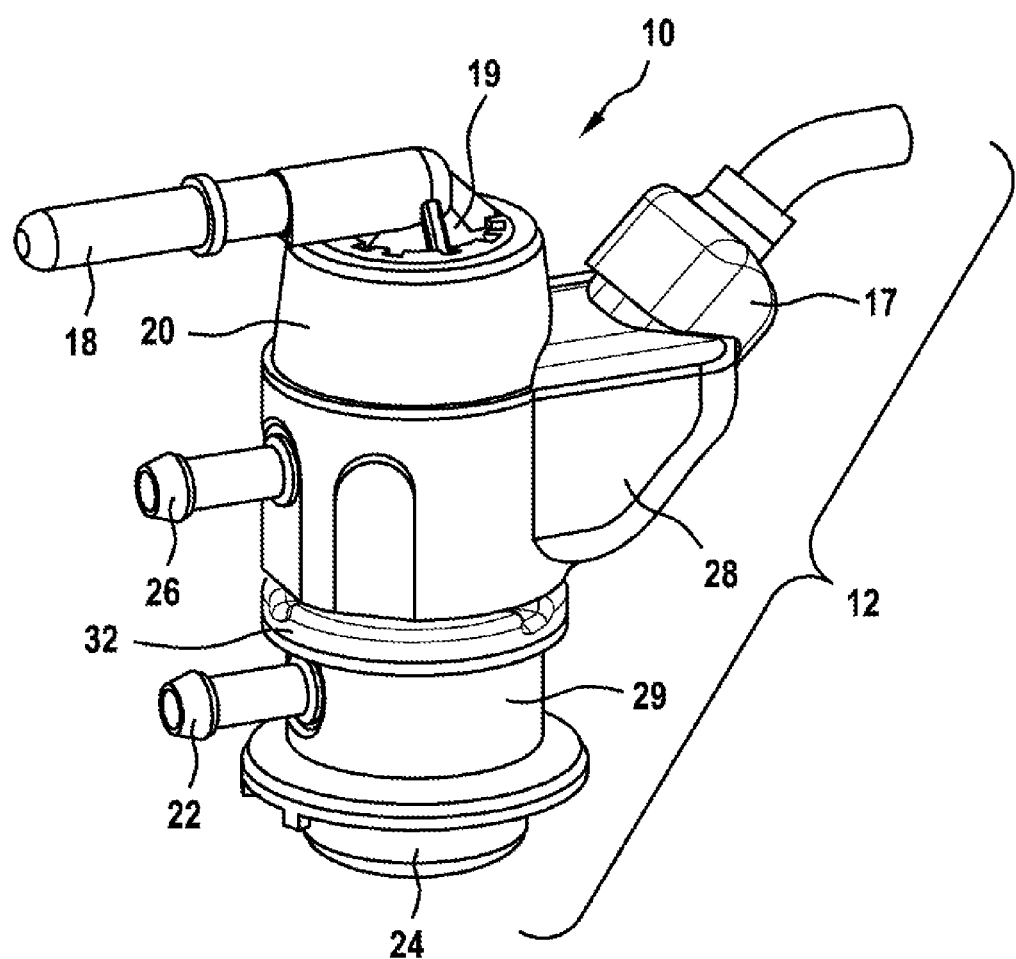
FIG. 1 shows a perspective representation of a metering module, which is enclosed by a multipart cooling element
Figure 2:
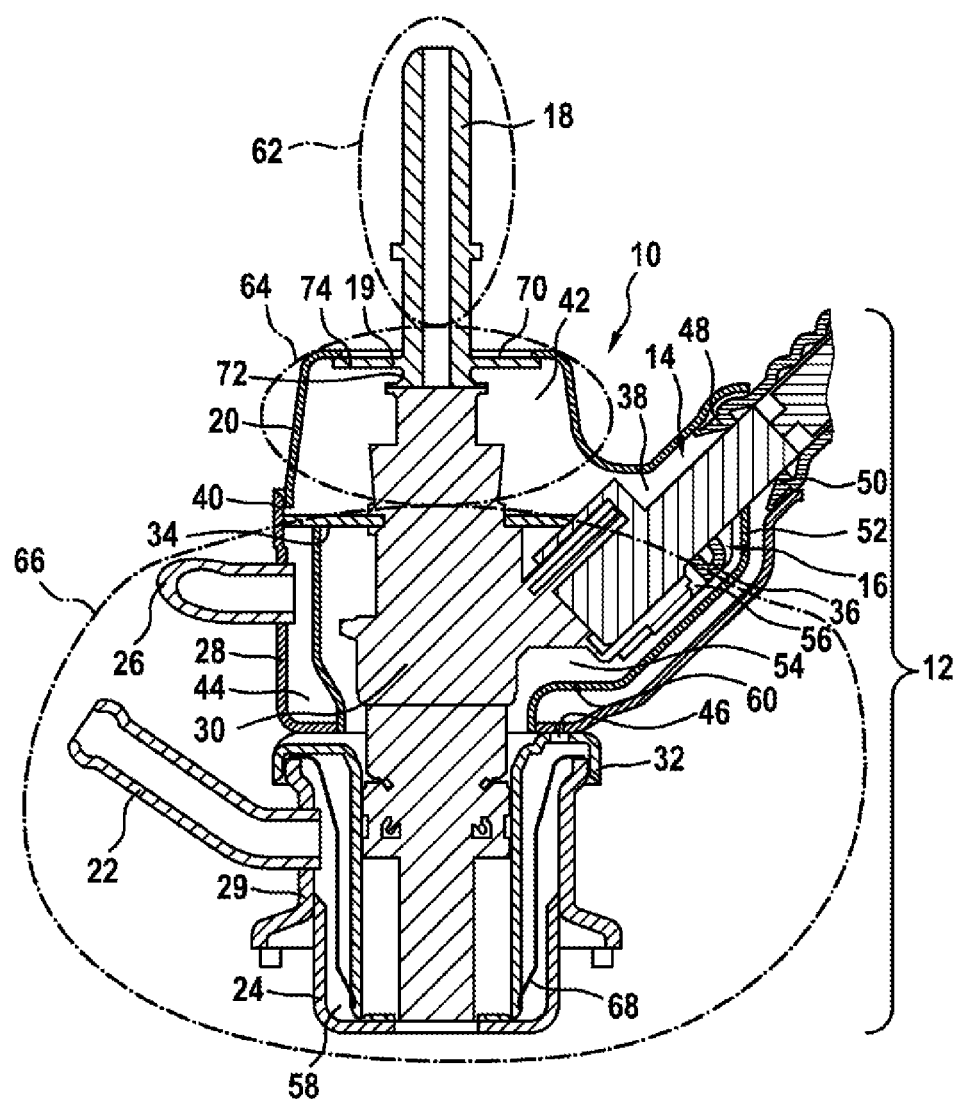
FIG. 2 shows a representation of a metering module in which a connection fitting is made of metal and is joined to an injection valve by a cohesive material connection.

The metering module described below with reference to FIGS. 1 and 2 is a metering module for introducing an automotive fluid/additive, in particular a reducing agent such as urea or a urea-water solution, for example, into the exhaust tract of an internal combustion engine. Temperatures ranging between 100° C. and 160° C. can occur in the immediate surroundings of the metering module 10 proposed according to the invention. Higher or lower temperature levels may also prevail depending on the intended purpose and the installed location. The automotive fluid/additive, in particular a reducing agent such as urea or a urea-water solution, for example, serves to reduce the $NO_x$ constituents which are present in the exhaust gas from internal combustion engines, to $H_2O$ and $N_2$. The device proposed according to the invention for cooling a metering module 10 may also be used in other metering devices which are to be operated within a specific temperature range as cooling for these.

FIG. 1 shows that a metering valve of a metering module 10 is enclosed by a complete encapsulation 12, which represents a second housing. The complete encapsulation 12 comprises an upper shell 20, which may be embodied in cap form, for example, and a plastic cover 17, which may be produced in particular from a material having elastic characteristics, such as a plastic material, for example, or a rubber. In addition the encapsulation 12 comprises a middle shell 28, together with a guide sleeve 32 arranged below the former, and below that a lower shell 29, into which a cupped insert 24 is inserted as is shown only partially in FIG. 1.

As can be seen from the perspective representation according to FIG. 1, the metering valve of the metering module 10 is entirely enclosed by the components 17, 20, 28 and 29 enumerated above. Only a lower end of the cupped insert 24 protrudes below the lower shell 29 of the complete encapsulation 12 of the metering module 10.

As can also be seen from the perspective representation according to FIG. 1, a cooling fluid inlet 22 is situated in the circumferential face of the lower shell 29. Situated opposite this in the circumferential face of the middle shell 28 is a cooling fluid return 26.

The representation according to FIG. 2 shows a metering module in which a connection fitting is made of metal and is connected by a cohesive material joint to an injection valve.

The cross section according to FIG. 2 shows that a metering valve 30 is completely enclosed by the encapsulation 12. The encapsulation 12 here comprises the upper shell 20. Extending through the upper shell 20 is the automotive fluid/additive inlet 18, via which in particular a reducing agent, such as urea or a urea-water solution, for example, is delivered to the metering module 10. FIG. 2 shows that this inlet 18 may be formed at an angle to a connection fitting 19 and is encapsulated by the upper shell 20 with a flange covering an upper end face of the metering valve 30. For its part the upper shell 20 comprises a cavity 42, which is separated from the cooling fluid by a dividing rib 60 against the middle shell 28, though the cavity 44 of which the cooling fluid is able to flow. As can additionally be seen from the sectional representation according to FIG. 2, the upper shell 20, in the area of a connector 16 or an electrical plug contact 36, comprises an air gap portion, which is part of an air gap insulation 14 of the electrical plug contact 16 or 36 of the metering module 10.

Situated below the upper shell 20, which is part of the encapsulation 12 of the metering module 10, is a middle shell, which is identified by the reference numeral 28. The middle shell 28 comprises a seat 40, into which the upper shell 20 defining the cavity 42 is inserted.

The middle shell 28 also encloses the metering valve 30, which in previous solutions was secured in an axial direction by the locking plate 34 still represented in FIG. 2. In the solution proposed according to the invention the locking plate 34 still drawn in in FIG. 2 can be dispensed with, since the axial locking of the metering valve 30 is now provided by the cohesive material connection, that is to say the second connecting seam 72 between the reducing agent inlet 18 of the connection fitting 19 and the corresponding connection of the metering valve body 30 in an axial direction.

The middle shell 28 is seated on a guide sleeve 32. For its part the guide sleeve 28 is accommodated on an insert 24 of substantially cupped design.

It can be seen from the sectional representation according to FIG. 2 that the middle shell 28 comprises the cavity 44, through which the cooling fluid flows and which at the same time also contains a first air gap portion 54 and a second air gap portion 56. The first air gap portion 54 and the second air gap portion 56 are separated from the cavity 44 by a dividing rib 60, which is formed in the middle shell 28. In particular, the profile of the dividing rib 60 in the middle shell 28 is selected in such a way that the first air gap portion 54 and the adjoining second air gap portion 56 extend along the electrical plug contact 36 towards the plug contact cover 17. The dividing rib 60, which separates the first air gap portion 54 and the second air gap portion 56 from the cavity 44 through which the cooling fluid flows, terminates at a wall end 52 of the middle shell 28. Also situated there, as on the opposite side of the upper shell, is a latching connection 50, cf. position 48 in FIG. 2. The plug contact cover 17 is detachably latched at both of the latching points 48 and 50, which are formed on the upper shell 20 on the one hand and on the middle shell 28 on the other. As already explained in connection with FIG. 1, the plug contact cover 17 is detachably connected to the outside of the middle shell 28 by a latch 48 on the upper shell 20 and by a latch 50 opposite the former.

Cooling through the air gap insulation 14 at the air gap portions 38, 54 and 56, as represented in FIG. 2, is afforded in the area of the electrical contacts 36. It can also be seen from FIG. 2 that the middle shell 28 represents a "hybrid component", which both comprises an air gap insulation in the area of the electrical plug contact 36 and which on the other hand contains at least one cavity 44, which is forcibly cooled, that is to say it has cooling fluid flowing through it.

The lower shell 29 is situated below the guide sleeve 32, as can be seen from the bottom area of FIG. 2. For its part the lower shell 29 receives the cupped insert denoted by the reference numeral 24. Temperatures of 120° C. and above can occur at the bottom end of the metering module 10. For this reason the cooling fluid inlet 22, into which the cooling fluid overflows into the lower shell 29 and thence into a cavity 66 of the cupped insert 24, is situated in the area of the lower shell 29. The injection nozzle, via which a spray mist of automotive fluid/additive and air is injected into the exhaust tract of the internal combustion engine, is also situated in the bottom area of the metering valve 30. Since operation dictates that the highest temperatures occur here, the cooling fluid inlet 22 is situated in this part of the metering module 10 so as to optimize the cooling effect, in order to ensure an optimum dissipation of heat in the area of the high temperatures occurring there.

It can also be seen from the sectional representation according to FIG. 2 that, after entering through the cooling fluid inlet 22 and flowing through the cavity 66 of the cupped insert 24, the cooling fluid flows via at least one passage 46 to the cavity 44 above the base of the middle shell 28. As FIG. 2 shows, passages 46 in the guide sleeve 32 and in the base of the middle shell 28 align with one another, so that after flowing through the cupped insert 24 the cooling fluid passes into the cavity 44 in the middle shell 28. After passing through the cavity 44 in the middle shell 28, which is imperviously separated by the dividing rib 60 from the air gap portions 54, 56, the cooling fluid, warmed by the waste heat from the metering module 10 as it flows around the latter, leaves the cavity 44 in the middle shell 28 at the cooling fluid return 26, as represented in FIG. 2. The passages 46 ensure transfer of the cooling fluid from the cavity 66 in the cupped insert 24 into at least the one cavity 44 in the middle shell 28 of the encapsulation 12.

FIG. 2 furthermore shows that an exposed area 62, that is to say an area that is neither liquid nor air-cooled, and which in particular comprises the area of the connection fitting 19, is situated on the metering module 10. In addition, FIG. 2 shows that an insulated area 64 is situated below the exposed area 62. In this area cooling ensues due to an air gap insulation 14, starting from the cavity 42, which is defined by the upper shell 20 in cap form. Situated below this insulated area 64 of the metering module 10 is a water-cooled area 66, which is cooled by the cooling fluid, which circulates through the various cavities 58 and 44 via the cooling water inlet 22 and the cooling water return 26. A dividing rib, which inside the middle shell 28 separates the first air gap portion 54 from the middle shell cavity 44, is denoted by the reference numeral 60.

The representation according to FIG. 2 shows that the connection fitting 19 has a connection plate 74 running circularly, for example, around the reducing agent inlet 18. In the solution proposed according to the invention this connection plate 74 of circular form, for example, is connected in the area of a first connecting seam 70 by a cohesive material joint to the connection fitting 19 made of metal. The first connecting seam 70 serves for the transmission of force, that is to say for transmitting forces acting on the reducing agent inlet 18 to the metering module 10. The first connecting seam 70 is preferably formed as a laser weld seam between the connection plate 74 and an area of the cap-shaped upper shell 20 of the connection fitting 19 situated opposite the former. In addition, the representation according to FIG. 2 shows that the reducing agent inlet 18 of the connection fitting 19 is connected to an end face of the metering valve body 30 by a cohesive material joint along a second connecting seam 72. The connection fitting 19 is configured to be connected in an ungraduated rotational position to the metering valve body 30 of the metering module 10. The cohesive material connecting seam 72 between the reducing agent inlet 18 of the connection fitting 19 and the corresponding connection of the metering valve body 30 is likewise made as a laser weld seam. This second connecting seam 72 constitutes a fluid seal, formed between the metering valve body 30 and the reducing agent inlet 18 of the connection fitting 19. The fluid seal represented by the second connecting seam 72 serves to protect the cavity 42 against the ingress of reducing agent. The dividing wall 34, which separates the cavity 42 from the middle shell cavity 44 for the cooling medium, serves to seal the two media cavities 42 and 44 off from one another, the dividing wall 34 being seated on the external geometry of the metering valve body 30.

The solution according to FIG. 2 and in particular the first connecting seam 70 between the circumferential connection plate 74 on the one hand and the inside of the upper shell part 20, made in the form of a metal cap, on the other provide mechanical relief for the metering valve body 30. The forces reduced by the connection fitting 19 are transmitted to the cooling element, that is to say the complete encapsulation 12, via the connection fitting 19 and are not transmitted directly to the metering module 10 enclosed by the complete encapsulation 12.

In the representation according to FIG. 2 the locking plate 34 has still been drawn in for the purposes of clarification. It can be seen that in FIG. 2 the axial locking plate 34 engages in a corresponding groove on the circumferential face of the metering valve 30, thereby securing this component in an axial direction. This locking plate 34 is dispensed with, since the task of axially securing the metering valve 30 is now assumed by the second connecting seam 72, as represented in FIG. 2.

What is claimed is:

1. A metering module having a metering valve comprising a metering valve body (30) for dispensing an automotive fluid/additive into an exhaust tract of an internal combustion engine, and the metering module also having a device for cooling the metering valve (10), the device including a housing (12) having a plurality of housing portions (19), (20), (28), (29), wherein a first housing portion (19), (20) is situated in a temperature-exposed area (62) of the metering module (10) and is made from a metal, wherein the first housing portion includes a connection fitting (19) and an upper shell (20), the connection fitting (19) having an inlet (18) for the automotive fluid/additive and the connection fitting (19) also having a connection plate (74), wherein the connection plate (74) and the upper shell (20) are fixed to one another along a first connecting seam (70), and wherein the metering valve body (30) and the connection fitting (19) are fixed to one another along a second connecting seam (72).

2. The metering module as claimed in claim 1, wherein the connection plate (74) and the upper shell (20) are fixed to one another by a laser weld seam.

3. The metering module as claimed in claim 2, wherein the metering valve body (30) and the connection fitting (19) are fixed to one another by a laser weld seam that constitutes a fluid seal.

4. The metering module as claimed in claim 3, wherein the connection fitting (19) and the upper shell (2) define a cavity (42).

5. The metering module as claimed in claim 4, wherein the connection fitting (19) is configured to be connected in an ungraduated rotational position to the metering valve body (30) of the metering module (10).

6. The metering module as claimed in claim 1, wherein the metering valve body (30) and the connection fitting (19) are fixed to one another by a laser weld seam that constitutes a fluid seal.

7. The metering module as claimed in claim 1, wherein the connection fitting (19) and the upper shell (20) define a cavity (42).

8. The metering module as claimed in claim 1, wherein the connection fitting (19) is configured to be connected in an ungraduated rotational position to the metering valve body (30) of the metering module (10).

9. The metering module as claimed in claim 1, wherein the upper shell (20) overlaps the connection plate (74) such that the first connecting seam (70) is at the overlap.

10. The metering module as claimed in claim 1, wherein the second connecting seam (72) axially secures the metering valve body (30) to the housing (12).

\* \* \* \* \*